Oct. 11, 1932. C. L. FINLAY 1,882,131
COLOR PHOTOGRAPHY
Filed Jan. 10, 1930
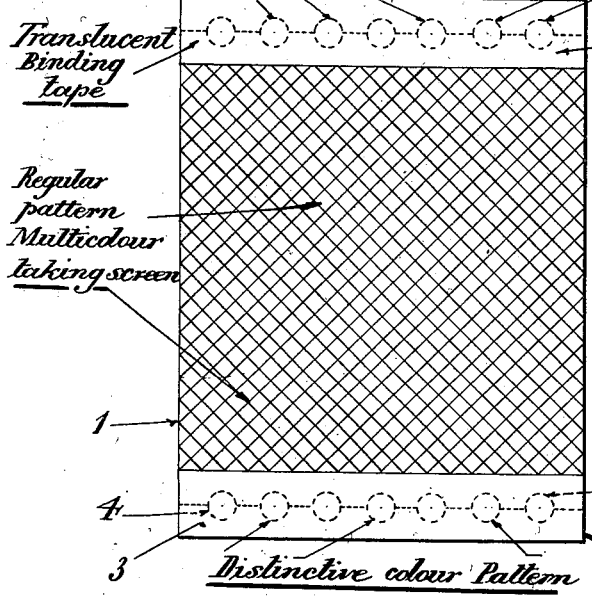
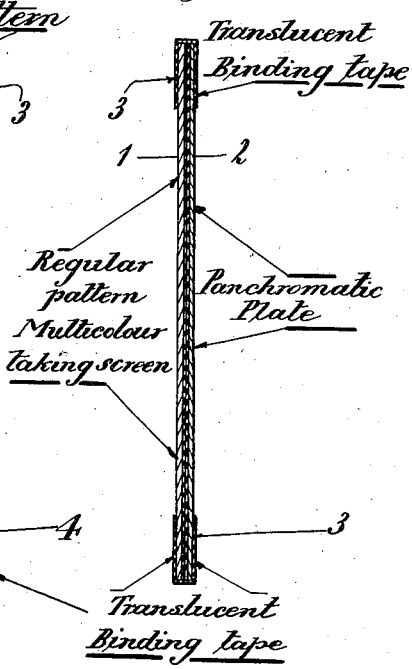

Patented Oct. 11, 1932

1,882,131

UNITED STATES PATENT OFFICE

CLARE LIVINGSTONE FINLAY, OF SLOUGH, ENGLAND

COLOR PHOTOGRAPHY

Application filed January 10, 1930, Serial No. 420,016, and in Great Britain February 9, 1929.

In using a regular pattern multicolor taking screen in color photography for producing a color negative of an object, it is found advantageous to provide two opposite edge portions of such a screen with distinctive color patterns or devices of various kinds (hereinafter referred to as distinctive color patterns) that can be reproduced on the opposite edge portions of a panchromatic plate by exposure thereof to light through the said edge portions of the screen, the distinctive color patterns thus produced on the plate serving to facilitate registration of the color negative of a subject subsequently produced on the plate, with, for instance, a similar regular pattern multicolor taking or viewing screen having similar distinctive color patterns, when subsequently using the color negative for reproducing therefrom, a positive transparency requiring accurate registration of the color negative with such other similar taking or viewing screens, or for other purpose.

In order to avoid the use of special apparatus for giving a separate exposure to the said edge portions of the taking screen at the time of exposing a panchromatic plate on the subject to be photographed, it has been found advantageous first to give the panchromatic plate a preliminary exposure through the registering edge portions only of the taking screen the screen and plate being for this purpose held together as by spring clips, the remainder of the screen and plate being covered and then to bind the taking screen and panchromatic plate together, by means of gummed binding strip material applied in a moistened condition over the edge portions of the juxtaposed screen and plate, and dried so as to produce a combined screen and plate, forming a unit that can afterwards be used at any desired time and place for photographing a subject on the remaining portion of the plate by exposure through the remaining portion of the screen, the marginal portions of the screen and plate, bearing respectively the distinctive color patterns and negative color records thereof, being protected during such exposure, so as to prevent a record of any portion of the subject being produced on said marginal portions of the plate. It will be obvious that there must not be the slightest shift or movement between the taking screen and panchromatic plate after the preliminary exposure of the edge portions of the screen and plate and before the subsequent exposure of the remainder of the plate through the screen to the subject to be photographed, otherwise the positional relationship between the distinctive color patterns on the edge portions of the screen and color records on the edge portions of the plate will be destroyed and subsequent registration of a negative or transparency produced from the color records of the distinctive color patterns on the marginal portions of the plate and of a subject photographed on the remainder of the plate through the remainder of the screen, with a taking or viewing screen corresponding to the original taking screen and provided with corresponding distinctive color patterns will be rendered impossible by the aid of such color patterns.

Now it is found in practice that relative shifting of the bound screen and plate does take place after a color record of the distinctive color patterns has been produced on the plate and before the remainder of the combined screen and plate can be exposed to the subject to be photographed, such shifting being due to the drying and consequent contraction of the binding strip material.

The present invention has for its object to provide, as a vendible unit, a combined regular pattern multicolor taking screen having at opposite marginal edge portions thereof, distinctive color patterns and a panchromatic plate having color records of the said color patterns firmly held in register therewith, the remaining portions of the screen and plate being normally protected from the effect of light but being available, by subsequent exposure to light, as and where required, for enabling a photograph of a subject to be produced on such remaining portion of the plate, the color records on the plate of the distinctive color patterns on the screen and of the photographed subject being developed for use after the plate is separated from the screen.

For producing such a combined screen and plate, a regular pattern multicolor taking screen having at opposite marginal edge portions thereof, distinctive color patterns, and a panchromatic plate, are first firmly bound together, after which the said marginal edge portions only of the screen bearing the distinctive color patterns and the corresponding marginal edge portions of the plate are subjected to a preliminary exposure to light so as to produce on the plate, color records of the said color patterns that will be maintained in accurate positional relationship with the color patterns on the screen when the remainder of the screen and plate is exposed on the subject to be photographed. During this exposure the marginal edge portions of the screen and plate are so protected that the marginal edge portions of the plate will not be exposed to the subject photographed.

In the accompanying illustrated drawing, Fig. 1 is a front elevation and Fig. 2 an edge view showing a combined regular pattern multicolor taking screen with distinctive marginal color patterns and a panchromatic plate. As the color dots on the screen are each only about $\frac{1}{350}$ of an inch in diameter, those shown in Fig. 1 are enormously magnified to enable them to be seen on the drawing.

According to one way of making a combined regular pattern multicolor taking screen and panchromatic plate of the kind described, the taking screen 1 and panchromatic plate 2 are, before any exposure thereof, firmly bound together by adhesive translucent or transparent binding strip material 3 applied in a moistened condition around and over the edge portions of the juxtaposed screen and plate and then allowed to dry thoroughly, after which the preliminary exposure of the opposite marginal edge portions of the screen 1 bearing the distinctive color patterns 4 and the corresponding portions of the panchromatic plate is made through the translucent or transparent binding strip material on the front side of the screen. In this way, any danger of the positional relationship of the registering distinctive color patterns on the screen with the color record thereof produced on the plate, being afterwards disturbed before the remainder only of the screen and panchromatic plate is exposed on a subject to be photographed, is entirely avoided.

Or the screen 1 and plate 2 may be bound firmly together for the purpose set forth, by applying the binding strip material around and over the opposite lateral edge portions of the screen and plate so as to leave the marginal end portions of the screen bearing the distinctive color patterns and the corresponding marginal portions of the plate uncovered, so that the preliminary exposure of the said marginal end portions of the plate can take place directly through the uncovered front marginal end portions of the screen. It is however preferred to effect the exposure through the covered front marginal portions of the screen as first described, as a better result can thereby be obtained. It is also in this case, preferred to use binding strip material 3 of a translucent nature, as such material will admit of sufficient light passing therethrough to form on the panchromatic plate, a color record of the distinctive color patterns on the screen, but will not admit of an image of an external subject passing therethrough and form a record on the plate. Consequently such translucent material will serve as the protective means necessary for protecting the marginal edge portions of the screen when photographing a subject through the remaining portion of the screen on the panchromatic plate. In each case, the bound screen and plate bearing respectively the registering color patterns and the color records thereof, in accurate register with each other, then form a vendible unit ready for exposure on a subject to be photographed as and where desired.

After such exposure the panchromatic plate 1 is removed from the screen 2 by severing or removing the binding strip material 3 connecting them and developed in known way to produce a negative of the distinctive color patterns and photographed subject from which a transparency can be made, also in known way, that can readily be registered with a regular pattern multicolor viewing screen corresponding to the original taking screen and having distinctive marginal color patterns also corresponding to those on the taking screen.

What I claim is:—

1. A method of producing, for use in color photography, a combined regular pattern multicolor taking screen having at opposite edge portions thereof, distinctive color patterns, and a panchromatic plate having color records of the color patterns held in accurate register therewith, said method consisting in first firmly binding the screen and plate together and afterwards effecting a preliminary exposure to light of the opposite marginal edge portions of the taking screen bearing the distinctive color patterns and the corresponding marginal edge portions of the panchromatic plate while the remaining portions of the screen and plate are covered.

2. A method of producing, for use in color photography, a combined regular pattern multicolor taking screen having at opposite edge portions thereof, distinctive color patterns, and a panchromatic plate having color records of the color patterns held in accurate register therewith, said method consisting in binding the screen and plate firmly together by binding strip material applied over and around edge portions of the juxtaposed screen and plate and afterwards effecting the exposure of the edge portions of the screen bearing the distinctive color patterns and the corresponding edge portions of the plate, to light, while the remaining portions of the screen and plate are covered.

3. A method of producing, for use in color photography, a combined regular pattern multicolor taking screen having at opposite edge portions thereof, distinctive color patterns, and a panchromatic plate having color records of the color patterns, held in accurate register therewith, consisting in binding the screen and plate firmly together by binding strip material that will admit of the passage of light therethrough and which is applied in a moistened condition around and over the edge portions of the juxtaposed screen and plate and after the binding strip has become dry and firmly secured to the screen and plate effecting the preliminary exposure of the opposite edge portions of the screen bearing the distinctive color patterns and the corresponding portions of the panchromatic plate to light, through the said binding strip material, while the remaining portions of the screen and plate are covered.

4. A method of producing, for use in color photography, a combined regular pattern multicolors taking screen having at opposite edge portions thereof, distinctive color patterns, and a panchromatic plate having color records of the color patterns, held in accurate register therewith, consisting in applying over the edge portions of the screen bearing the distinctive color patterns and the corresponding edge portions of the plate, moistened strip binding material of a translucent nature and after the strip material has become dry and firmly secured to the screen and plate, exposing the opposite edge portions of the screen bearing the distinctive color patterns and the corresponding portions of the plate to light through the binding strip material while the remaining portion of the screen and plate are covered.

5. As a new article of manufacture, a firmly bound regular pattern multicolor taking screen and panchromatic plate bearing respectively-distinctive color patterns and color records thereof, in accurate register with each other, and constituting a vendible unit ready for exposure at any time or place on a subject to be photographed.

Signed at London, England, this twenty-sixth day of November 1929.

CLARE LIVINGSTONE FINLAY.